Figure 1:
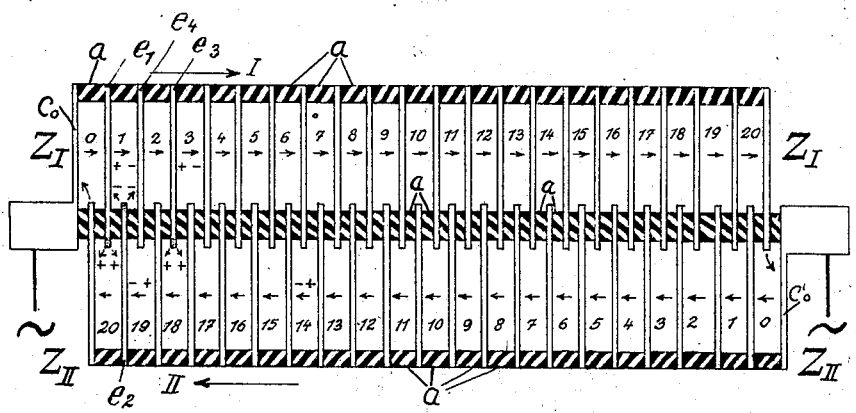

Aug. 22, 1944.  F. SLEDZIANOWSKI  2,356,541
APPARATUS FOR ELECTROLYTIC PRODUCTION OF HYDROGEN

Filed Aug. 2, 1940

Inventor:

Frey Sledzianowski

Patented Aug. 22, 1944

2,356,541

UNITED STATES PATENT OFFICE 2,356,541

APPARATUS FOR ELECTROLYTIC PRODUCTION OF HYDROGEN

Franz Sledzianowski, Berlin-Charlottenburg, Germany; vested in the Alien Property Custodian Application August 2, 1940, Serial No. 349,437
In Germany April 29, 1939

2 Claims. (Cl. 204—236)

This invention relates to a plant for the production of hydrogen by electrolysis, using alternating current.

According to the present invention the hydrogen is produced from an aqueous solution by means of electrolyser cells filled with the electrolyte, said cells having pairs of mutually staggered electrode surfaces of high electric load and being connected to a source of alternating current. The system briefly stated operates in such manner that the electrolyte is enriched with an agent capable of fixing the oxygen which is set free during the electrolysis, the oxidation products being separated from the electrolyte.

Advantageously the cell aggregate of the electrolyser is constructed as a double cell aggregate including electrodes with extensions projecting through the intermediate solid wall and into the respective opposite cell of the double cell aggregate.

The electric load of the electrodes may be, e. g., up to 300 amperes per square decimeter of the electrode surface, and the voltage may be about 1.6 to 1.8 volts per cell. Advantageously the temperature, current intensity and, as far as possible, also the concentration of the electrolyte are maintained constant during the electrolysis.

According to a preferred embodiment of the invention, a cyclic process is maintained by continuously separating the oxidation products from the electrolyte and re-enriching the electrolyte with fresh oxygen-fixing agent. An attack upon or decomposition of the electrode substance of the electrodes which, for instance, may consist of nickel plates of a large effective surface, is counter-acted in my process by the symmetrical arrangement of the voltage potentials and the anode depolarisation.

According to one embodiment of the invention the electrolysis is carried out under pressure, the pressure advantageously being adjustable. In this case the cell aggregate is arranged electrically insulated in a pressure tank which advantageously is provided with a water supply and a pressure control organ, the electrolyte passing through the pressure tank and the cell aggregate in a closed cycle. The pressure tank with the electrode aggregate may be provided with a collecting chamber for the hydrogen which is being produced in the electrolysis, the hydrogen being drawn from this collecting chamber and delivered to its place of use or to storage tanks.

According to a preferred embodiment of the invention a filter separator and a saturation vessel for the electrolyte mixture are connected to the pressure tank, through pipe lines including shutting-off and control means, as well as a cooling device for the electrolyte. The filter separator and the saturation vessel should be constructed to permit their convenient filling and discharge. The electrodes are preferably disposed at different heights, in a slanting relationship, whereby the passage of gas and electrolyte and the separation of the oxidation products are facilitated.

My novel electrolytic system for the production of hydrogen is economic and reliable in operation, yielding a hydrogen of high purity; it is very suitable also for portable plants, since the hydrogen can be produced practically under any pressure by means of a plant of relatively simple and robust construction. The invention will be better understood by reference to the following detailed description in connection with the accompanying drawing showing by way of example and schematically an embodiment of the invention and in which—

Figure 2:
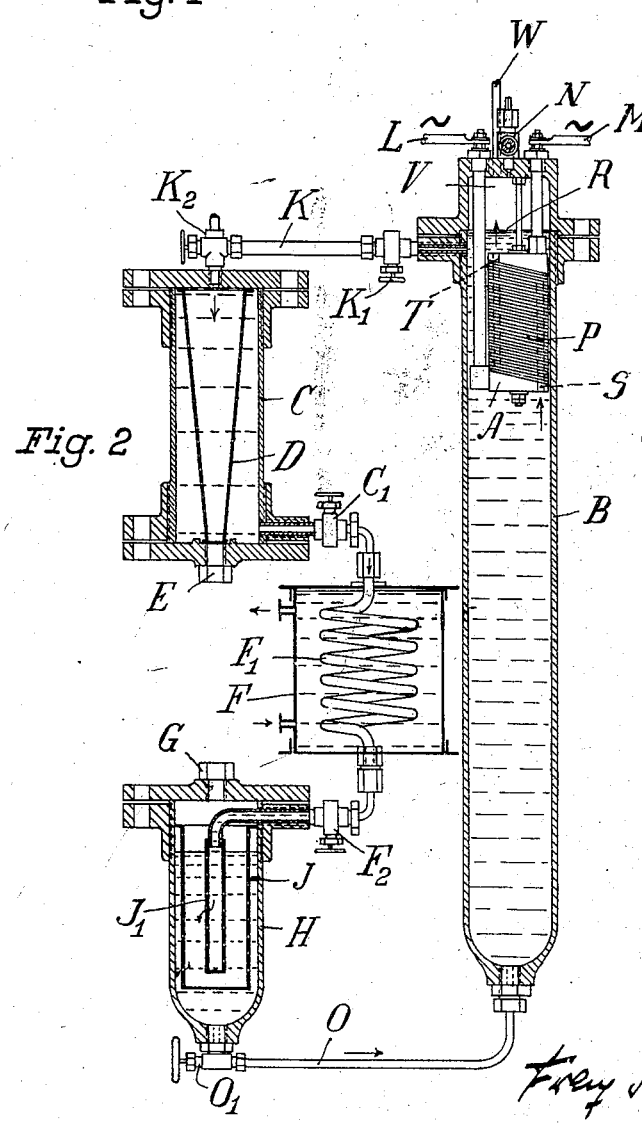

Fig. 1 is a diagrammatic view of an electrode double cell aggregate having the invention applied thereto and Fig. 2 is a longitudinal section through a pressure electrolyser plant including a cell aggregate in accordance with Fig. 1 disposed in the pressure tank.

Referring to Fig. 1, there are shown 20 working cells $1$ to $20$ in each cell aggregate $Z_I$ and $Z_{II}$, respectively, the electrodes $e$ of the two cells being disposed in pairs which are mutually staggered and insulated from each other. In addition, a rectifier cell $0$ is arranged in series before each set of cells $1$ to $20$. The end of each electrode $e$ extends through the intermediate solid wall made up of spacers $a$ and into the opposite cell of the opposite cell aggregate. An electrolytic solution is disposed in, or passing through, all the cells, consisting, for instance, of an aqueous KOH solution of 30% strength enriched with an oxygen-fixing agent, for instance, sodium sulfite. The load of the electrode surface by the alternating current connected to the end cells may be, for instance, up to 300 amperes per square decimeter. The current after passing through the rectifier cells $0$ causes production of hydrogen in the cells $1$ to $20$ of the two groups of cells $Z_I$ and $Z_{II}$. The oxygen produced in the electrolyte owing to the effect of the anode voltage and the depolarisation effect of the anode is fixed and crystallised out of the KOH solution in the form of a salt which can be eliminated, while the electrolyte in the course of the process is again enriched with the oxygen-fixing agent. If the electrolysis is carried into effect under pressure, the speed of reaction of the oxidation increases with the pressure. As shown in Fig. 1, each electrode $e_1$, $e_2$, $e_3$, $e_4$ ... of one series of cells projects into the space between a pair of electrodes of the other series of cells, with the exception of the extreme end electrodes $e_0$ and $e'_0$, of the two series of cells, which of course have no portions extending into an opposite cell. A source of alternating current is connected across said extreme end electrodes $e_0$ and $e'_0$, while the intermediate electrodes are insulated from each other by spacer members $a$.

It has been found by numerous practical experiments that free hydrogen can be continuously produced with an apparatus of this description, by means of alternating current connected to the apparatus as hereinbefore described, while the oxygen which is obviously produced at the same time by decomposition of the water is fixed to the oxygen-fixing agent, for instance, sodium sulfite.

It will not be attempted to offer a conclusive theoretical statement as to how the production in this apparatus of hydrogen by means of alternating current is to be explained, basing on the conventional electrolytic theory; however, it may be assumed that the alternating current obviously acts virtually as a pulsating or intermittent direct current, thus producing free hydrogen, while the oxygen is fixed by an oxygen fixing agent.

Referring now to Fig. 2, it has been assumed that an electrode cell body A constructed in accordance with the principle of Fig. 1 has been mounted in insulated relationship in a pressure tank B. The plant of Fig. 2 is intended for carrying out a high pressure alternating current electrolysis. It will be noted that the electrode system B of the cell body A is disposed in a slanting relationship so as to favor the circulation of gas and electrolyte. The electrolyte may be the same as above, namely, an aqueous KOH solution of 30% strength which is enriched or saturated, for example, with sodium sulfite.

The electrolyte level R in the pressure tank B is provided to be somewhat above the cell body A. The hollow spaces of the salt separator C which is connected to the pressure tank B and provided with a salt filter D, as well as the cooling serpentine $F_1$ and the saturation vessel H and the connecting pipes are also filled with the electrolyte. The screen basket J, $J_1$ of the saturation vessel H is filled with the fresh oxygen-fixing agent, for instance, sodium sulfite.

If an alternating current of high current intensity is connected across the terminals L and M of the cell body A, the electrolytic process described above with reference to Fig. 1 takes place in the cell body A, at the electrodes P thereof. While the agent contained in the electrolyte, for instance, sodium sulfite, is enriched by the oxygen produced in this process and converted in the case of sodium sulfite, into sodium sulfate, the hydrogen which is being produced, rises with the heated electrolyte, through the discharge channel T, from the cell body A to the top and is collected in the gas dome V thereof. The electrolyte current acts to wash or rinse the sulfate which is separated in the form of salt through the pipe line K and the control and shut-off organs $K_1$, $K_2$ into the sieve insert of the separator C in which the sodium sulfate is screened from the electrolyte. The electrolyte which after this elimination consists substantially of KOH solution only passes through the separator C, D and the control and shutting-off member $C_1$ into the cooling serpentine $F_1$ of the cooler F where it is cooled and allowed to pass, through the control and shutting-off member $F_2$, into the saturation vessel H. The electrolyte passes through the sieving basket J. $J_1$ which is filled with sodium sulfite, thus again being saturated with fresh oxygen fixing agent, i. e., sodium sulfite. The electrolye which is thus saturated, is directed from the saturation vessel H through the shutting-off and control member $O_1$ and the pipe line O into the lower portion of the pressure tank B and, rising through the channel S in the cell body A, to the electrodes P thereof, where the above described electrolytic process and cycle is repeated.

The pressure of the hydrogen which is being produced during the electrolysis and collected in the gas dome V of the pressure tank B may be adjusted as desired by the over-pressure valve N of the pressure tank and directed from the pressure tank to its place of use or to a storage tank. From time to time the salt filter D of the salt separator C must be discharged by means of the closure screw E; the sieve basket J of the saturation vessel H is filled at intervals by means of the closure screw G; the feed of water to the pressure vessel B at W should be maintained constant.

In the process according to the present invention there is substantially required the supply of electric energy, water, and oxygen fixing admixture only. The oxidation products which may be of different nature, depending upon the nature of the admixture, are also commercially useful; if desired, these by-products may be dressed or prepared and improved in further processes, for rendering the electrolyte process still more economic.

If the temperature and current intensity are maintained constant, there is practically hardly any using up of the electrode material which for instance, may consist of nickel plates having a larger effective surface. Another advantage of the invention is the small space occupied by the plant and the simple and handy operation thereof.

The method and apparatus of the present invention have been described in detail with reference to specific embodiments. It is to be understood, however, that the invention is not limited by such specific reference but is broader in scope and capable of other embodiments than those specifically described and illustrated in the drawing.

It is also to be understood that the following claims are intended to cover all of the generic and specific features of the invention herein described, and all statements of the scope of the invention, which, as a matter of language, might be said to fall therebetween.

I claim:

1. An apparatus for the electrolytic production of hydrogen from an equeous electrolytic solution, comprising in combination two series of electrolyser cells each having transverse electrodes, the electrodes of one series being staggered with respect to the electrodes of the other series, and a common intermediate solid wall through which each electrode of the series of cells projects entirely across the cell and into the space between a pair of electrodes of the other series of cells, with the exception of one oppositely located extreme end electrode of each series of cells and terminals for a source of alternating current connected across said two extreme end electrodes and adapted to produce on said electrodes a high ratio of current intensity to electrode surface.

2. An apparatus for the electrolytic production of hydrogen from an aqueous electrolytic solution, comprising in combination two series of electrolyser cells each having transverse electrodes, the electrodes of one series being staggered with respect to the electrodes of the other series, and a common intermediate solid wall through which each electrode of the series of cells projects entirely across the cell and into the space between a pair of electrodes of the other series of cells, with the exception of one oppositely located extreme end electrode of each series of cells, and terminals for a source of alternating current connected across said two extreme end electrodes and adapted to produce on said electrodes a high ratio of current intensity to electrode surface through an electrolyte in said cells, said electrolyte containing an agent adapted to fix the oxygen which is set free during the electrolysis, means for maintaining through said cells a continuous circulation of said electrolyte, means for separating the oxidized products from said electrolyte after it has left said cells, means for re-enriching said oxide-free electrolyte with fresh oxygen-fixing agent, and means for re-cycling said oxide-free and re-enriched electrolyte.

FRANZ SLEDZIANOWSKI.